Figure 3:
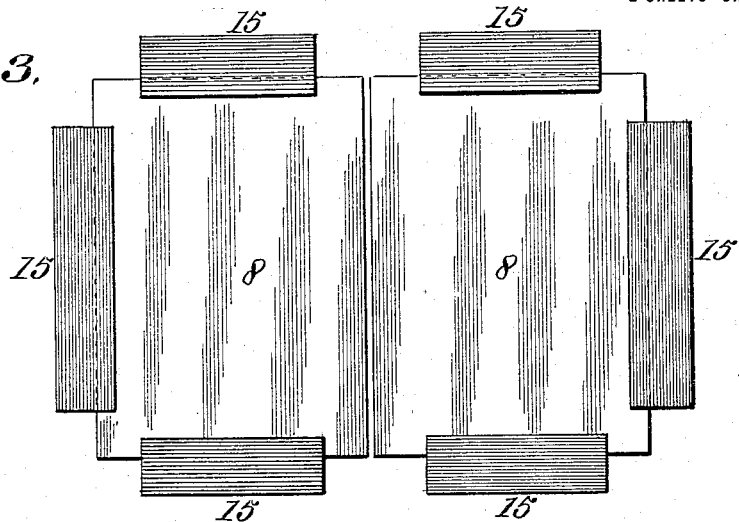

X. M., L. G. & C. F. McGLASHAN.
SPREADING BOARD FOR ENTOMOLOGICAL SPECIMENS.
APPLICATION FILED MAY 5, 1915.
1,172,816.
Patented Feb. 22, 1916.
2 SHEETS—SHEET 1.
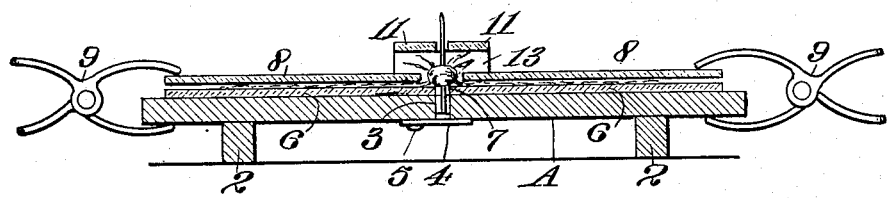
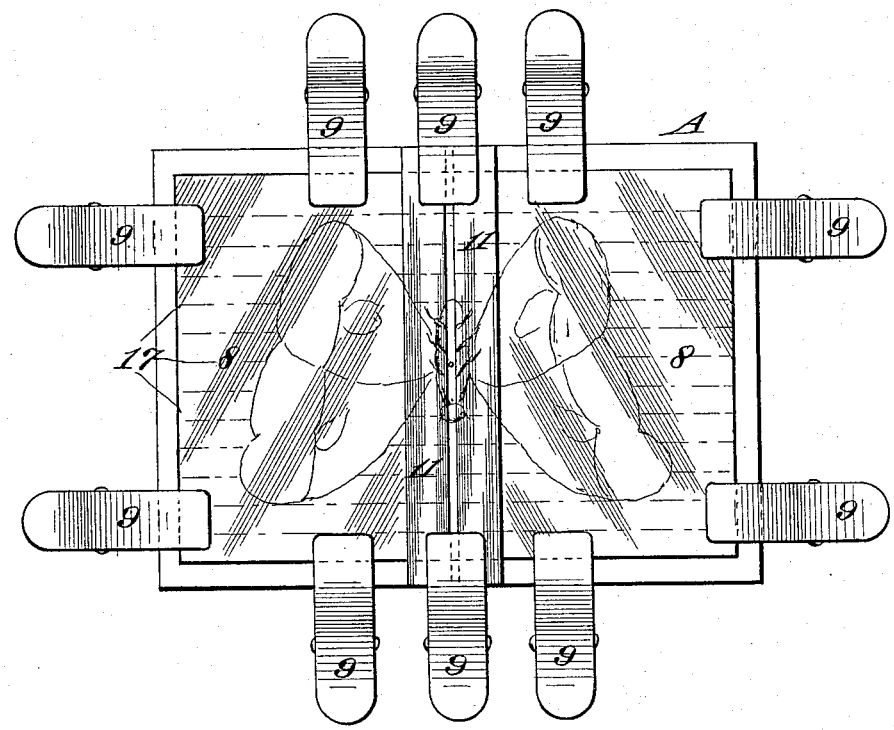
WITNESSES:
Charles Pickles
Thos. Castberg
Inventors.
Ximena M. McGlashan
Leonora G. McGlashan,
Charles F. McGlashan,
BY G. H. Strong.
ATTORNEY X. M., L. G. & C. F. McGLASHAN.
SPREADING BOARD FOR ENTOMOLOGICAL SPECIMENS.
APPLICATION FILED MAY 5, 1915.

1,172,816.

Patented Feb. 22, 1916.
2 SHEETS—SHEET 2.

WITNESSES:
Charles Rokles
Thos Castberg

Inventors.
Ximena M. McGlashan
Leonora G. McGlashan
Charles F. McGlashan.
BY G. H. Strong
ATTORNEY

UNITED STATES PATENT OFFICE.

XIMENA M. McGLASHAN, LEONORA G. McGLASHAN, AND CHARLES F. McGLASHAN, OF TRUCKEE, CALIFORNIA.

SPREADING-BOARD FOR ENTOMOLOGICAL SPECIMENS.

1,172,816.   Specification of Letters Patent.   Patented Feb. 22, 1916.

Application filed May 5, 1915. Serial No. 25,928.

*To all whom it may concern:*

Be it known that we, XIMENA M. McGLASHAN, LEONORA G. McGLASHAN, and CHARLES F. McGLASHAN, citizens of the United States, residing at Truckee, in the county of Nevada and State of California, have invented new and useful Improvements in Spreading-Boards for Entomological Specimens, of which the following is a specification.

This invention relates to a spreading block or board for entomological specimens.

One of the objects of the present invention is to provide a simple, easily operated spreading board, upon which the wings of butterflies, moths and other winged insects may be spread and firmly held in position between plates of glass while the wings are drying. Spreading blocks or boards heretofore in use have consisted of blocks or strips of wood upon which the wings of the insect are placed and secured by threads, pins, pinned strips of paper, or weighted pieces of cardboard or glass. By our method glass is placed beneath as well as above the wings and not only is a superior product produced, but the smooth surfaces of the glass sections enable the wings to be easily expanded, and so greatly expedite the work of spreading. The great obstacle in providing a spreading block or board with a surface of glass has heretofore been that insects are impaled upon entomological pins, and the pins must pass through the glass. Our invention provides a simple means for passing the pin through or between the lower glasses, and at the same time automatically adjusts the height of the insect upon the pin. Means are also provided to securely fasten the upper and lower plates in position while exerting a gentle pressure upon the interposed wings, thus giving the dried wings the appearance of having been smoothly ironed.

Another object of the invention is to provide a body compressor by which the legs, body and antennæ of the insect may be held and shaped while drying.

Further objects will hereinafter appear.

The invention consists of the parts and the construction and combination of parts as hereinafter more fully described and claimed, having reference to the accompanying drawings, in which—

Figure 4:
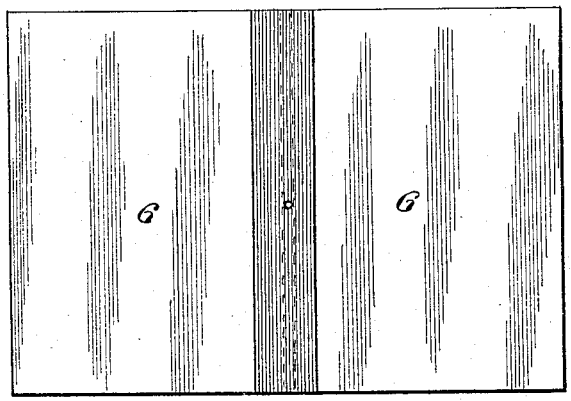
Figure 5:
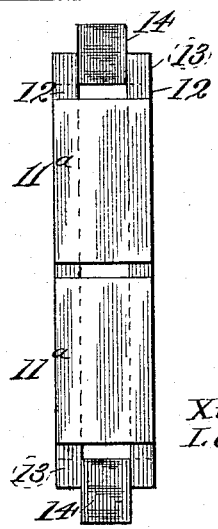

Figure 1 is a plan view of the spreading board showing the specimen in position. Fig. 2 is a cross section of Fig. 1. Fig. 3 is a plan view of the two top plates, showing strips of paper secured thereto provided for fastening purposes. Fig. 4 is a plan view of the spreading board, showing the lower glass plates in position and the slot between them covered by a paper strip. Fig. 5 shows a slight modification of the body compressor.

A indicates a base-board constructed of wood, pulp, or other suitable material which is supported upon cleats 2 and in which is formed a central opening 3 which is adapted to be closed from the lower side by means of a strip of paper or thin metal strip 4 which may be pivotally mounted, as at 5, to be swung into or out of register with the opening. Suitably secured on the top surface of board A, preferably by a transparent paste or glue, is a pair of glass plates 6. These plates are slightly separated to form a central slot 7 which is just sufficiently wide to permit a pin to pass therethrough. In some instances a solid glass plate may be used instead of two separated sections 6. In that instance a hole sufficiently large to permit the pin to pass through is provided.

For the purposes of alining the insect and arranging the wings in the proper position with relation to each other, the surface of the base-board may be lined up with a waterproof ink, impervious to paste or glue, such as indicated at 17. The use of lines thus drawn across the face of the base-board is of great value as it permits the insect to be perfectly alined and arranged; this being entirely feasible in the present instance as the lower glass plates 6 are transparent with this object in view.

In operation, the butterfly, or other specimen to be spread and dried, pinned through the thorax with an entomological pin in the usual manner, is placed in an inverted position, back downward, upon the glass plates 6, with the body in alinement with the slot 7, the head of the pin being thrust through the opening 3, slot 7 and downward until it rests against the upper surface of the plate 4 covering the bottom of the opening 3. In thus placing the insect it may be manipulated by taking hold of the point of the entomological pin. With the point of a spreading needle partly spread the wings on one side and lay loosely thereon one of the plates 8 as a weight to hold body and pin in position. Expand the wings on the other side, cover them with the other glass 8 and fasten it firmly. Removing the plate used as a weight, expand wings to the same lines 17 as the ones already expanded, and fasten plate over them.

The provision of plate 4 is of considerable importance as it provides an automatic height adjustment. It is very desirable to have the back of each insect in a collection at a uniform height upon the pin, the general though not universal rule being that one-third of the pin should project above the back. This would be automatically accomplished if one-third of the pin extended from the back of the insect lying on the surface of plates 6 through the slot 7, the central opening in the base-board 3 to the upper surface of the plate 4. When collectors prefer a greater or lesser length of pin above the back of the insect the pivotally mounted plate 4 may be swung out of register with the opening and the head of the pin be allowed to project farther, or a stop may be introduced in the bottom of the central opening lessening the distance.

The pair of covering plates 8, constructed of transparent glass to permit of proper alinement of wings, when placed over the wings as described, may be secured in this position by means of spring clamps 9. Considerable pressure is thus brought to bear upon the wings of the specimen and their surfaces are perfectly smooth and entirely free from wrinkles while drying. The body and legs which are turned upward during the process of spreading and drying may be held in place and artistically arranged in this instance by means of a compressor plate 11, preferably of glass. This glass plate may consist of one or two sections, as shown in Figs. 1 and 2, running parallel with the body, or it may consist of two separate sections, such as indicated at 11ᵃ in Fig. 5 which are supported on cross strips 12. The body and legs of specimens of different species will vary greatly in thickness and will require compressors of different heights which may be effected by using higher or lower supports, such as indicated at 13. An exact measure may thus be produced of the height of the body and legs so as to accurately indicate the width of space between the glass sections of the mount in which the insect is finally placed.

The compressor plate or plates may be secured in position by spring clamps, such as indicated at 9, or by fastening thereto adhesive strips of paper 14, such as indicated in Fig. 5. The cover sections of glass 8, may similarly be fastened by adhesive strips of paper, such as indicated at 15, Fig. 3. These sections of paper may be glued or pinned to the base-board. The separation of the glass sections constituting the compressor permits the point of the pin to protrude any suitable distance while the body and legs are held in place during the drying process.

The scales on the back of the butterfly should be pressed as smoothly as those of the wings, and the slot 7, between the base-plates, however narrow, may allow some of the scales or antennæ to enter. For the purpose of preventing this a strip of thin paper is glued over the separated sections of glass, thus covering the slot and still permitting the pin to pass through.

A spreading block or board constructed as here shown produces far superior results to the spreading boards and blocks heretofore used, as the smooth surfaces of the glass plates between which the specimen is pressed and held while drying gives the wings a uniformly flat and smooth appearance. The specimen can, furthermore, be much more easily and quickly placed in position, and the wings can be expanded without the usual danger of being punctured and torn by the spreading needle. The transparency of the glass plates allows the operator to see each stage of the process and the slightest error in alinement can be observed and rectified. The provision of the central opening through the plates and baseboard not only insures that the pin will be at right angles to the plane of the wings, but also provides an automatic spacer or gage so that when pinned in the cabinet each insect's back will be in a line with its neighbor's. The compressor enables a scientific arrangement of legs, antennæ and body to be made, and these, together with the wings, are at all times visible through the glass coverings, during all the time the specimen remains on the spreading block. A perfect product can thus in all instances be procured with a minimum of care, time and labor.

The materials and finish of the spreading block or board are otherwise such as the experience and judgment of the manufacturers may dictate.

We wish it understood that various changes in form, proportions and minor details of construction may be resorted to within the scope of the appended claims, and that we do not wish to limit ourselves to the specific design and construction here shown.

Having thus described our invention, what we claim and desire to secure by Letters Patent is—

1. A spreading block comprising a baseboard, a glass plate forming a covering for said board and adapted to support a specimen, a pair of glass plates forming a covering for the specimen, and means for applying pressure on said plates to press the wings of the specimen and to secure the plates in position.

2. A spreading block comprising a base-board, a glass plate forming a covering for said board and adapted to support a specimen, a pair of glass plates forming a covering for the specimen, means for securing said covering plates in a fixed position on the specimen, a compression plate to cover the body and spread the legs of the specimen, and means for securing said plate.

3. A spreading block comprising a base-board, a glass plate forming a covering for said board and adapted to support a specimen, a pair of glass plates forming a covering for the specimen, means for securing said covering plates in a fixed position on the specimen, a compression plate to cover the body and spread the legs of the specimen, and means for securing said plate and adjusting it vertically with relation to the base-board.

4. A spreading block of the character described comprising a base-board having a central opening formed therein, a glass plate having an opening formed therein registering with the first named opening, said glass plate forming a covering for the base-board and adapted to support a specimen, a pair of glass plates forming a covering for the specimen and means for securing said covering plates on the base-board.

5. A spreading block of the character described comprising a base-board having a central opening formed therein, a glass plate having an opening formed therein registering with the first named opening, said glass plate forming a covering for the base-board and adapted to support a specimen, a pair of glass plates forming a covering for the specimen, means for securing said covering plates on the base-board, and a removable closure for the central opening in the base-plate.

6. A spreading block of the character described comprising a base-board having a central opening formed therein, a glass plate having an opening formed therein registering with the first named opening, said glass plate forming a covering for the base-board and adapted to support a specimen, a pair of glass plates forming a covering for the specimen, means for securing said covering plates on the base-board, and a plate pivotally mounted on the lower side of the base-plate adapted to be swung into or out of register with the central opening in the base-plate.

7. A spreading block of the character described comprising a base-board having a central opening formed therein, a pair of glass plates secured on the base-board, one on each side of the central opening, said plates adapted to receive and support the specimen, and means for applying pressure on said plates to press the wings of the specimen and to secure the plates on the base-board.

8. A spreading block of the character described comprising a base-board having a central opening formed therein, a pair of glass plates secured on the base-board, one on each side of the central opening, said plates adapted to receive and support the specimen, means for securing said plates to the base-board, a compression plate forming a covering for the body of the specimen, said plate having an opening formed therein in alinement with the central opening in the base-board, means for securing said plate to the base-board, and means for adjusting it vertically.

9. A spreading block of the character described comprising a base-board having a central opening formed therein, a pair of glass plates secured on the base-board, one on each side of the central opening, said plates adapted to receive and support the specimen, means for securing said plates to the base-board, a compression plate having an opening formed therein in alinement with the central opening in the base-board, means for securing said plate to the base-board, means for adjusting it vertically, and a plate pivotally mounted on the lower side of the base-plate adapted to be swung into or out of register with the central opening in the base-plate.

In testimony whereof we have hereunto set our hands in the presence of two subscribing witnesses.

XIMENA M. McGLASHAN.
LEONORA G. McGLASHAN.
CHARLES F. McGLASHAN.

Witnesses:
W. F. WILKIE,
R. C. KOEPKE.

Copies of this patent may be obtained for five cents each, by addressing the "Commissioner of Patents, Washington, D. C."